(12) United States Patent
Chandel et al.

(10) Patent No.: US 9,100,811 B2
(45) Date of Patent: Aug. 4, 2015

(54) SYSTEM AND METHOD FACILITATING COMMUNICATION IN AN ADAPTIVE VIRTUAL ENVIRONMENT

(71) Applicant: Tata Consultancy Services Limited, Mumbai (IN)

(72) Inventors: Priyanka Chandel, Thane (IN); Pankaj Doke, Thane (IN); Sylvan Lobo, Thane (IN); Kushal Gore, Thane (IN); Ramiz Raza, Thane (IN); Sujit Devkar, Thane (IN); Praveen Sunka, Thane (IN); Sanjay Kimbahune, Thane (IN)

(73) Assignee: TATA CONSULTANCY SERVICES LIMITED (IN)

( * ) Notice: Subject to any disclaimer, the term of this patent is extended or adjusted under 35 U.S.C. 154(b) by 0 days.

(21) Appl. No.: 14/017,477

(22) Filed: Sep. 4, 2013

(65) Prior Publication Data

US 2014/0066041 A1    Mar. 6, 2014

(30) Foreign Application Priority Data

Sep. 4, 2012 (IN) .......................... 2565/MUM/2012

(51) Int. Cl.
  *H04W 8/20* (2009.01)
  *H04L 29/08* (2006.01)
  *H04L 12/24* (2006.01)
(52) U.S. Cl.
  CPC ............ *H04W 8/205* (2013.01); *H04L 41/084* (2013.01); *H04L 67/08* (2013.01); *H04L 67/1095* (2013.01); *H04L 67/2861* (2013.01); *H04L 67/34* (2013.01)
(58) Field of Classification Search
  CPC ...... H04L 41/22; H04L 12/282; G09B 19/24; G09B 5/00; G09B 9/00; G05B 15/00; G05B 2219/13174; G06F 9/455; G06F 11/261; G06F 17/5009; G06F 2009/45562
  USPC ............ 455/432, 502, 418, 419, 434; 703/23, 703/25; 709/223, 224, 225
  See application file for complete search history.

(56) References Cited

U.S. PATENT DOCUMENTS 7,664,626 B1 * 2/2010 Ferrie .............................. 703/23
8,060,074 B2   11/2011 Danford et al.
(Continued)

OTHER PUBLICATIONS

Chen et al., "Virtual smartphone over IP," IEEE WoWMoM (2010).
Huerta-Canepa et al., "A virtual cloud computing provider for mobile devices", 2 ACM Workshop on Mobile Cloud Computing & Services: Social Networks and Beyond. MCS'10, San Francisco, California, USA (Jun. 15, 2010).
(Continued)

*Primary Examiner* — Nizar Sivji
(74) *Attorney, Agent, or Firm* — Finnegan, Henderson, Farabow, Garrett & Dunner LLP (57) ABSTRACT

A system for facilitating communication in an adaptive virtual environment is disclosed. For example, the system creates a virtual image of a communication device running services rendered by one or more telecom service providers, wherein the communication device belongs to a user. The system emulates hardware and software configuration of the communication device in the virtual image, wherein the virtual image is stored in the memory. The system synchronizes the memory, storing the hardware and software configuration in the virtual image, with a device memory of a user device at pre-determined intervals of time. The system further remotely installs the hardware and software configuration in the user device upon executing the virtual image thereby creating a virtual environment in the user device. The system further generates a unique number for the user. The system further facilitates communication using the one or more telecom service providers based upon the unique number.

9 Claims, 6 Drawing Sheets

(56) References Cited

U.S. PATENT DOCUMENTS

| | | | |
|---|---|---|---|
| 8,898,668 B1* | 11/2014 | Costea et al. | 718/100 |
| 2006/0271537 A1* | 11/2006 | Chandrasekharan et al. | 707/7 |
| 2009/0036111 A1* | 2/2009 | Danford et al. | 455/419 |
| 2009/0164994 A1 | 6/2009 | Vasilevsky et al. | |
| 2010/0022306 A1 | 1/2010 | Campion | |
| 2013/0155083 A1* | 6/2013 | McKenzie et al. | 345/522 |
| 2013/0183949 A1* | 7/2013 | Sulmar | 455/415 |
| 2015/0019191 A1* | 1/2015 | Maturana et al. | 703/13 |

OTHER PUBLICATIONS

Hung et al., "Executing mobile applications on the cloud: Framework and issues," Computers and Mathematics with Applications, vol. 63, pp. 573-587 (2012).

Fernando et al., "Mobile cloud computing: A survey," Future Generation Computer Systems vol. 29, pp. 84-106 (2013).

* cited by examiner

SYSTEM AND METHOD FACILITATING COMMUNICATION IN AN ADAPTIVE VIRTUAL ENVIRONMENT

PRIORITY CLAIM

This U.S. patent application claims priority under 35 U.S.C. 119 to Indian Application No. 2565/MUM/2012, filed Sep. 4, 2012. The aforementioned application is incorporated herein by reference in its entirety.

TECHNICAL FIELD

The present disclosure relates generally to a communication technologies, and more particularly to a system and method facilitating communication in an adaptive virtual environment.

BACKGROUND

Mobile phones provide a memory with large storage capacity, which may allow a user to not only store a large amount of data in it, also maintain all day-to-day tasks. Loss of the mobile device, loss of the network or discharge of the battery of mobile phone may cause a user to be unable to access the data stored in the mobile phone or remain connected with others. The privacy of data stored in the mobile phone may also be at risk in case of loss.

One of the ways to prevent this is to maintain an offline copy of the data by synchronizing it with a computer. Phones have made it possible to enjoy services of two service providers by using dual SIM cards in a single handset. This feature is dependent on the service providers and number of SIM slots in the hardware. Also, the user has to maintain and distribute more than one contact number. In a case when there is low battery situation, use of more than one SIM cards may not be feasible solution to remain in contact. Usage of two SIM cards in a single handset is a feature which is not always supported by all mobile handsets, and the user may be forced to select such a handset which is capable of providing dual-SIM facility.

SUMMARY

In one embodiment, an adaptive virtual environment communication system is disclosed, comprising: a processor; and a memory storing processor-executable instructions comprising instructions to: create one or more virtual images of one or more communication devices via a virtual network; emulate one or more features of the one or more communication devices; synchronize the emulated features in real-time by receiving data from the one or more communication devices at pre-determined intervals of time; and execute one or more of the images of the one or more communication devices.

In one embodiment, an adaptive virtual environment communication method is disclosed, comprising: creating one or more virtual images of one or more communication devices via a virtual network; emulating one or more features of the one or more communication devices; synchronizing the emulated features in real-time by receiving data from the one or more communication devices at pre-determined intervals of time; and executing one or more of the images of the one or more communication devices.

In one embodiment, a non-transitory computer-readable medium is disclosed, storing computer-executable adaptive virtual environment communication instructions comprising instructions to: create one or more virtual images of one or more communication devices via a virtual network; emulate one or more features of the one or more communication devices; synchronize the emulated features in real-time by receiving data from the one or more communication devices at pre-determined intervals of time; and execute one or more of the images of the one or more communication devices.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

One or more components may be described as modules. For example, a module may include self-contained components in a hardware circuit comprising of logical gate, semiconductor device, integrated circuits or any other discrete component. The module may also be a part of any software programme executed by any hardware entity for example processor. The implementation of a module as a software programme may include a set of logical instructions to be executed by the processor or any other hardware entity. Further a module may be incorporated with the set of instructions or a program via an interface.

The present disclosure relates to a system and method for facilitating communication in an adaptive virtual environment. The disclosed embodiments may create one or more virtual images of one or more communication devices by emulating one or more features of the communication device. The virtual images created on a virtual network may be executed on the communication device by first installing them and later running them. A unique number may be generated for each user in the virtual network itself. The unique number could be provisioned and dynamically commissioned by any of the telecom service provider. User can maintain plurality of virtual images for utilizing the services of more than one telecom service providers by using this unique number.

Figure 1:
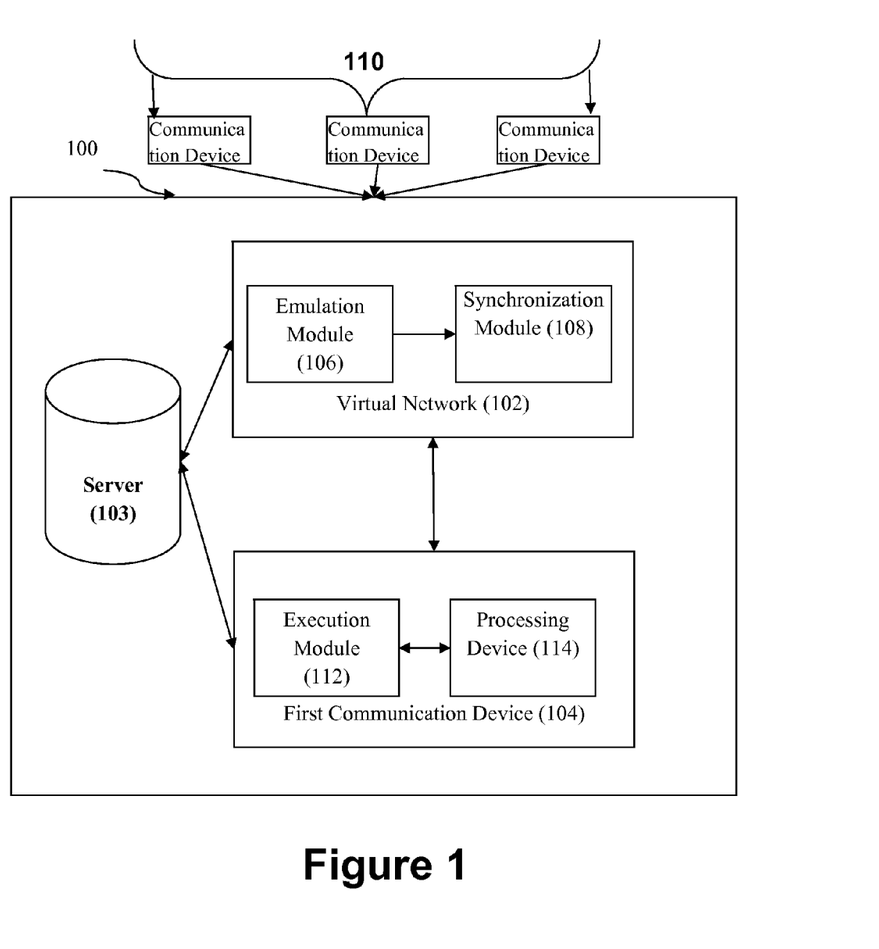
FIG. 1 illustrates the architecture of a system facilitating communication in a virtual environment, in accordance with some embodiments.

In accordance with some embodiments, referring to FIG. 1, a system (100) may comprise a virtual network (102) which may be configured to create one or more virtual images of one or more communication devices 110. The virtual network (102) further may comprise an emulation module (106) and a synchronization module (108). The system (100) further may comprise a first communication device (104) (hereinafter interchangeable referred as a "user device 104") communicating with the virtual network (102) for supporting the execution of one or more images thus creating a virtual interface in the first communication device itself for supporting the communication in a virtual environment. The first communication device (104) further may comprise an execution module (112) and a processing device (114).

In accordance with an embodiment, still referring to FIG. 1, the virtual network (102) may be configured to create one or more images of the one or more communication devices (110). The virtual network (102) may include but is not limited to internet cloud like Amazon Web Services (AWS®), Google Application Engine (GAE®) etc. The communication device may include but is not limited to a cell phone, laptop etc.

The virtual network (102) further may comprise the emulation module (106) which may be configured to emulate one or more features of the one or more communication devices (110) and store them in a memory storage unit. The virtual network (102) may be further provided with a plurality of servers (103), hereinafter interchangeably referred to as a server 103, servers 103, a backend server 103, and a cloud server 103, with one or more databases having large data storage capacity. All the data emulated by emulation module (106) may be further saved in these databases. The emulation module (106) may be capable of emulating hardware components (like antennas) via parameterization and configuration of the underline ways physical hardware and also software applications (like call dialing and receiving application). This emulation further supports the configuration of a virtual image in this virtual network where the user can access all his features in the virtual network (102).

One or more features of the communication device emulated by the emulation module (106) may include but is not limited to the application for making or receiving a call, application for browsing internet etc.

The virtual network (102) further may comprise the synchronization module (108) which may be configured to synchronize the emulated features in real-time by receiving data from the communication device (104) at a regular interval of time. Data received from the communication device (104) may include but is not limited to contact details stored in a cell phone, image files, text files etc. By way of a specific example, let us consider a case, when a user's memory card gets corrupted and he loses all his data. Since the user has already created the virtual image of his mobile phone, he can now access his lost data by using the virtual interface present in his mobile phone. He simply has to run the virtual image which may be present in his mobile phone (in the form of set of programming instructions) which can never be lost/deleted without the user's consent and will remain in the user's mobile phone. When the user is communicating by using this virtual image, he may add new contact details or text or image files in his mobile phone. This newly added data will automatically be saved in the virtual network (102) by means of this synchronization module (108). This process will be done by the system (100) in a continuous manner till the user himself quits or closes the use of virtual image by using the virtual interface. This feature makes the virtual environment adaptive in nature.

The synchronization module (108) acts like a bridge between the virtual network (102) and the communication devices (104). The synchronization module (108) may be further configured to allow a user of the communication device to customize the features stored in the virtual network (102). By this, the user may instruct the emulation module (106) to emulate only the features as desired by the user rather emulating all the features.

On the other hand, the synchronization module (108) also allows the user to choose various predesigned applications/features present in the virtual image. The user can choose to have various programs, utility and games prebuilt onto that image. The user can also choose look and feel, skin and customize everything on each virtual image.

Figure 2:
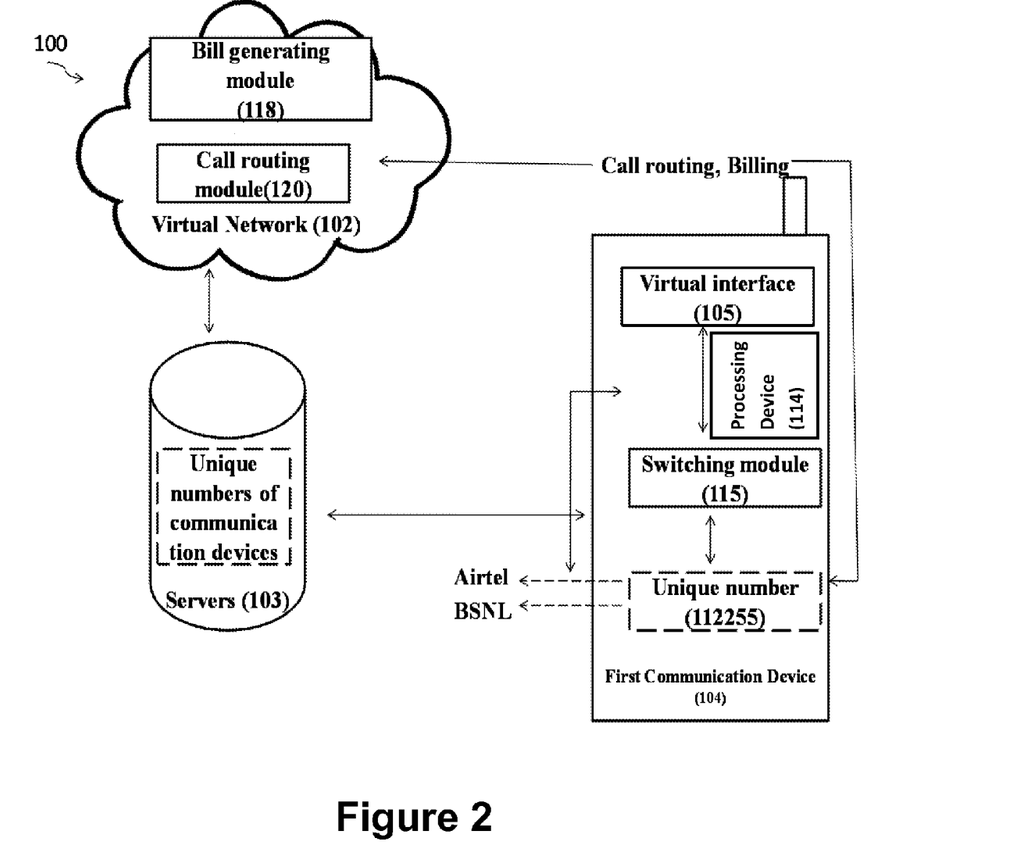
FIG. 2 illustrates the detailed architecture of a system facilitating unique number generation and communication in a virtual environment, in accordance with some embodiments.

Referring to FIGS. 1 and 2, the system (100) further may comprise the first communication device (104) communicating with the virtual network (102) for supporting the execution of one or more images thus creating the virtual interface (105) inside the first communication device (104) to run and execute the virtual images thus created. The first communication device (104) further may comprise the execution module (112) which may be configured to first install and later run one or more virtual images created over the virtual network (102). By way of a specific example, the first communication device (104) may be fundamentally capable, like most of the modern smart-phone based devices, to have connectivity via wireless network. The device then connects over wireless network connectivity to the virtual network (102) and upon transactions which are based on credential based access, downloads any of the existing virtual image existing in the virtual image storage path, to the first communication device (104) over wireless network which may be essentially an internet or TCPIP connectivity. Once it gets downloaded the entire virtual image runs on the first communication device (104). For the running or execution of the virtual image thus installed, connectivity via internet may be not essential. The communication device (104) would now act as a normal mobile device.

Still referring to FIGS. 1 and 2, the first communication device (104) further may comprise the processing device (114) or agent which may be configured to generate a unique number for each user irrespective of number of virtual images owned by the user. This unique number provides an uninterrupted connectivity with people in the contact list irrespective of a particular telecom service provider such that the virtual network (102) remotely manages the connectivity of the first communication device (104) with one or more telecom service providers by using the respective virtual image.

There could be multiple ways to generate the unique number which would be used as a universal communication number for the user. This unique number may be the identity of a particular communication device, and may be generated or provided by any of the service provider. The user will be registered with all the service providers. However, the unique number will be commissioned based on the user requirement. If the user does not immediately associate the unique number with any of the service provider after generation, then it can be forfeited by the provisioning service provider and recycled to be used for another user. The telecom service providers (like Airtel, BSNL) and PSTN may also be communicated and the information will be provided by the first communication device (104) and the servers (103) for one or more utility purpose and for security protocols.

By way of a specific example, let us assume that the user communicates with the virtual network (102) for the first time and selects the features to be emulated and stored in the virtual network and creates a virtual image. It's a mandatory step to select at least one telecom service provider along with the data or calling plan so that the user may start his communication in the virtual environment. Along with this, while creating the virtual image for the first time or choosing the first telecom service provider a unique number may be also generated which will be linked to all the telecom service providers in a case when user selects more than one telecom service provider. The user then share this unique number as his contact number and also use services of all the telecom service providers under this unique number.

The switching module (115) of the first communication device (104) may be further configured to select one or more telecom service provider from a list stored in the virtual network (104). This selection may be performed by log in into the virtual image storage using the credentials.

Again referring to FIG. 2, the first communication device (104) further may comprise a switching module (115) which may be configured to support a feature of switching from one telecom service provider to other. Thus, according to the requirement, the user can switch from one telecom service provider to another telecom service provider by selecting the respective virtual image linked with the corresponding telecom service provider. This switching from one telecom service provider to another occurs without any time delay, as user may be registered with all telecom service providers and number commissioning could be done dynamically. Also, the user has no burden of maintaining of the plurality of contact numbers because, he can use the unique number as his universal contact number. This universal number will be responsible for other specific purposes like billing etc.

Again referring to FIG. 2, the system (100) further may comprise a backend server (103) to support the communication between the virtual network (102) and the user device (104).

The virtual network (102) further may comprise a call routing module (120) to enable a feature of call routing by using the virtual image and a bill generating module (118) to generate bill for the first communication device (104) with respect to the service provided by one or more telecom service providers. The bill generated by the bill generating module (118) can be in a consolidated form, i.e. a single bill for all the service providers or a different bill for each service provider. These features of generating a bill or routing a call are further performed by using the universal number.

The system and method illustrated to facilitate a communication in an adaptive virtual network may be illustrated by working example stated in the following paragraph; the process is not restricted to the said example only.

Figure 3:
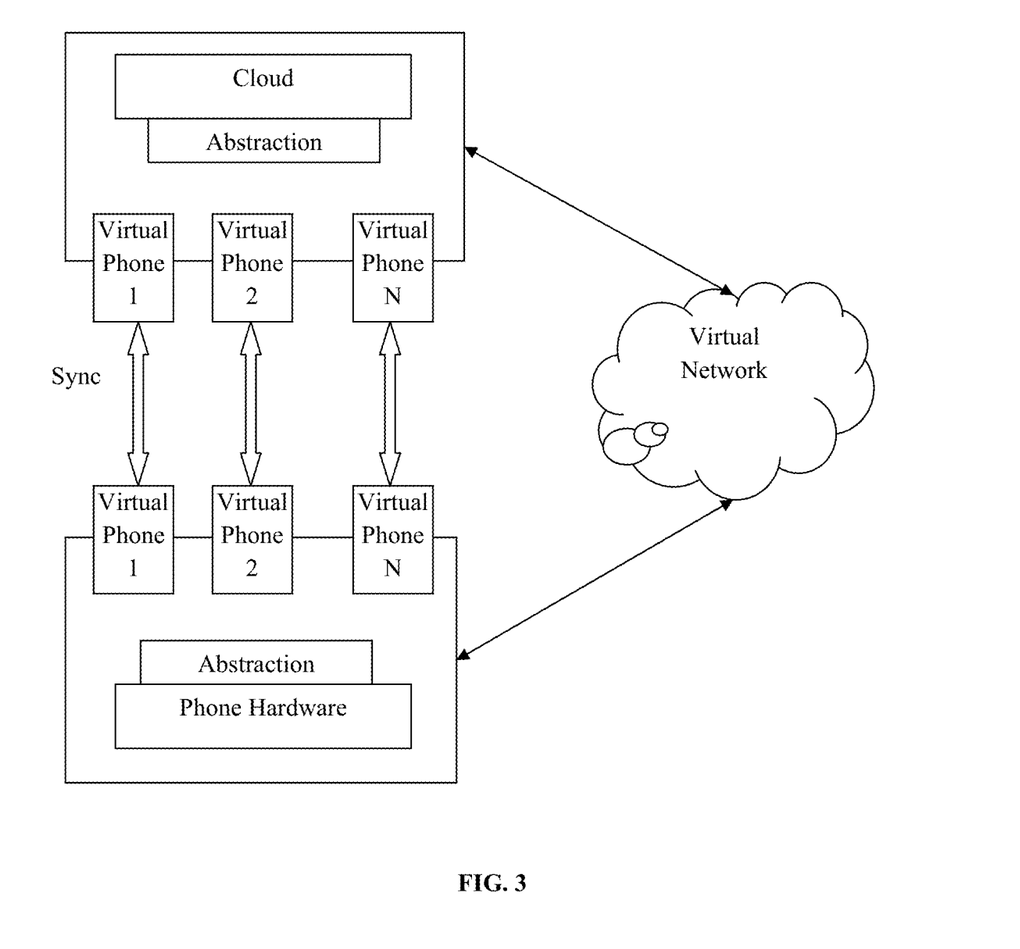
FIG. 3 illustrates the flow of communication in a virtual environment, in accordance with some embodiments.
Figure 4:
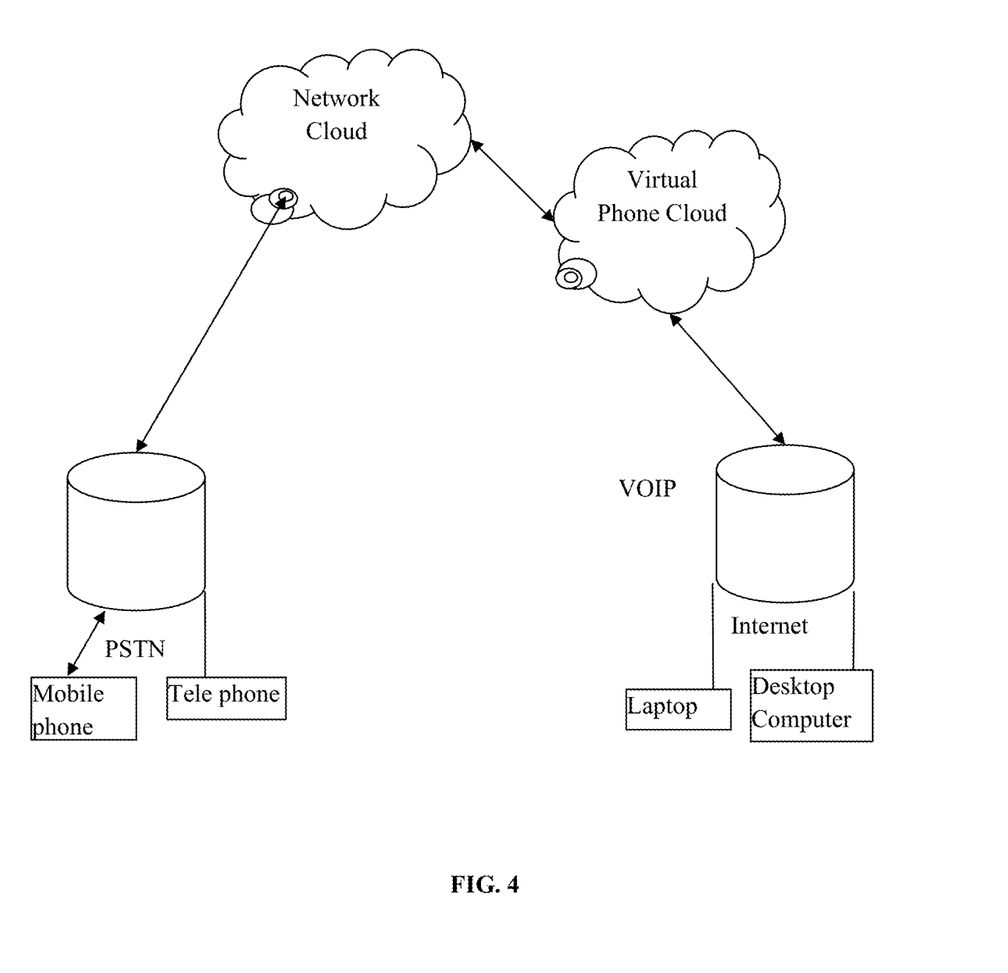
FIG. 4 illustrates call routing in accordance with some embodiments.

Referring to FIGS. 3 and 4, all the virtual images thus created over the virtual network are stored in a cloud server 103. The emulated features are stored in the virtual network are synchronized with that of stored in the phone hardware, laptop desktop etc. When someone calls on the unique number, generated by the processing device (114), and if the person doesn't pickup or activate voice message then the call it will land up as a voice message over cloud (virtual network) and the voice call gets recorded and stored in the cloud account of (virtual network) the user. The user can further setup a routing table or a forwarding address (call routing module) for this unique number which has been configured and can be locally routed. Like if the user knows that he is in US then any call which originates from India gets routed over VOIP and gets terminated in a local call and user has access to it via voice mail. The call routing and bill generating feature are supported by connecting to the respective PSTN (Public Switched Telephone Network). Moreover, the unique number may be also provided a link with the reference numbers of the said PSTN for supporting all calling features.

Figure 5:
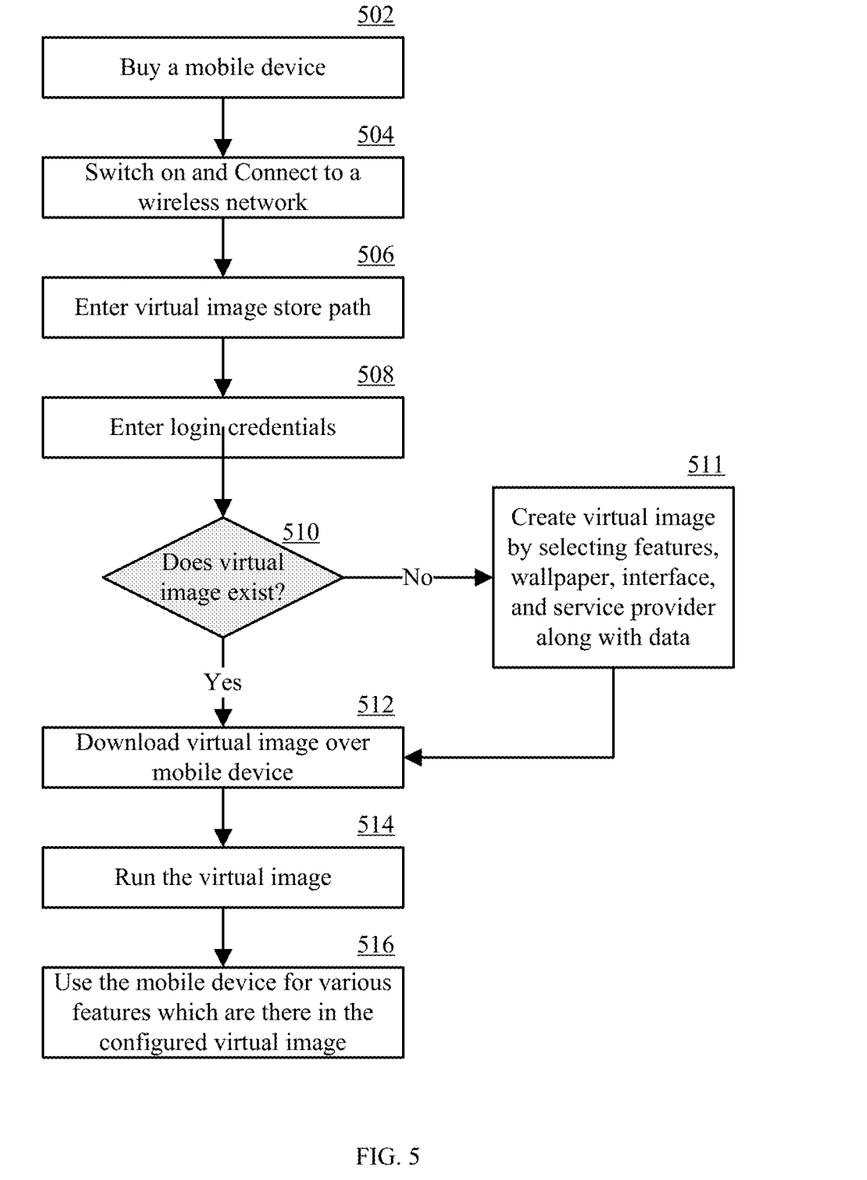
FIG. 5 illustrates a flow chart illustrating steps involved for creating and running a virtual image in some embodiments.

Referring to FIG. 5, let us consider a user 'A' purchases a communication device say a mobile device (as shown in step 502). Since, the mobile phone may be compatible, user 'A' connects to a wireless network in order to browse the internet (as shown in step 504). The user 'A' then enters the virtual image store path (as shown in step 506) where created virtual images of his mobile phones are stored. Here, the user may be asked to provide his login credentials in order to initiate the process of download of virtual image (as shown in step 508). The user 'A' then checks the virtual image storage system whether virtual image which the user wants to create already exists or not.

If the image does not exist, user 'A' then starts creating the virtual image of his mobile phone. The virtual image may be created by selecting mobile phone's features, wallpaper, interface and service provider along with the data plan (as shown in step 510). The emulation module emulates all the features selected by the user 'A'.

In case, the virtual image existed there, the user A can download it over his mobile phone (as shown in step 512). This will also create a virtual interface on the user A's mobile phone, by which he can run the virtual image (as shown in step 514). Also, the user A's mobile device will be provided with either a switch, a dial mechanism or a key for connecting to the virtual image repository for switching the virtual image or user A can use wireless network to again connect to the virtual image repository.

Once, the image is successfully downloaded and run, user A can use the mobile phone and can use various features like call dialing, receiving, browsing internet, chatting, sending messages etc which are there in the configured virtual image (as shown in step 516).

Computer System

Figure 6:
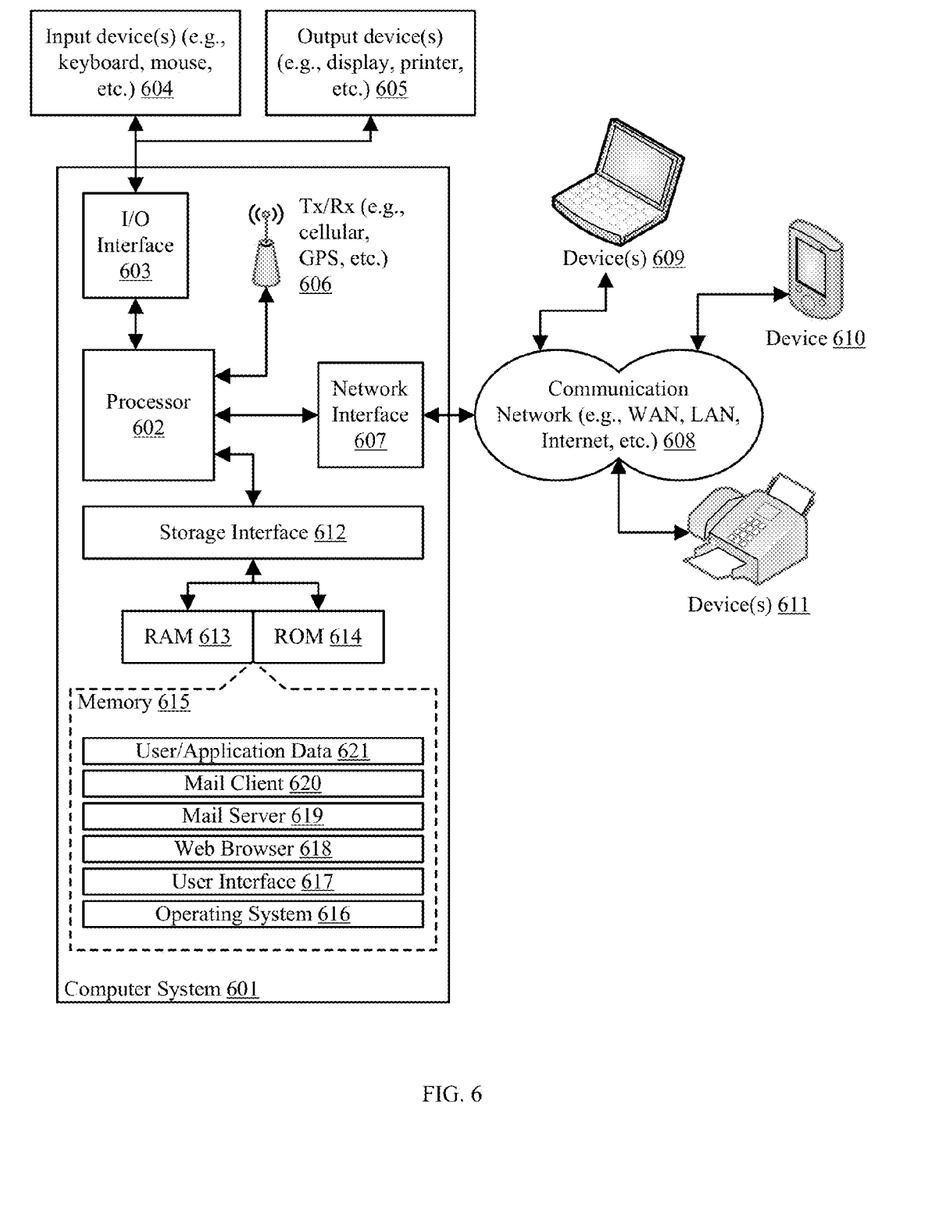
FIG. 6 is a block diagram of an exemplary computer system for implementing embodiments consistent with the present disclosure.

FIG. 6 is a block diagram of an exemplary computer system for implementing embodiments consistent with the present disclosure. Variations of computer system 601 may be used for implementing the devices and algorithms disclosed herein. Computer system 601 may comprise a central processing unit ("CPU" or "processor") 602. Processor 602 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM'S APPLICATION, embedded or secure processors, IBM® PowerPC, INTEL'S® Core, ITANIUM®, XEON®, CELERON® or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WiLink WL1283, Broadcom BCM47501UB8, INFINEON TECHNOLOGIES® X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® iPHONE®, BLACKBERRY®, ANDROID®-based phones, etc.), tablet computers, eBook readers (AMAZON® KINDLE®, NOOK®, etc.), laptop computers, notebooks, gaming consoles (MICROSOFT®, XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX®, UNIX®-like system distributions (e.g., BERKELEY® SOFTWARE DISTRIBUTION (BSD), FREEBSD®, NETBSD®, OPENBSD® etc.), Linux distributions (e.g., Red Hat®, Ubuntu®, Kubuntu® etc.), IBM® OS/2®, Microsoft® WINDOWS® (XP®, VISTA®/7/8, etc.), APPLE® iOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems AQUA®, IBM® OS/2, MICROSOFT® WINDOWS® (E.G., AERO®, METRO®, etc.), UNIX® X-WINDOWS®, web interface libraries (e.g., ACTIVEX®, JAVA®, JAVASCRIPT®, AJAX®, HTML®, ADOBE® FLASH®, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. MICROSOFT® INTERNET EXPLORER®, GOOGLE® CHROME®, MOZILLA® FIREFOX®, APPLE®, SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML®, ADOBE® FLASH®, JAVASCRIPT®, JAVA®, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP®, ACTIVEX®, ANSI C++/C#, MICROSOFT® .NET®, CGI SCRIPTS®, JAVA®, JAVASCRIPT®, PERL®, PHP®, PYTHON®, WEBOBJECTS® etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as APPLE® MAIL®, MICROSOFT® ENTOURAGE®, MICROSOFT® OUTLOOK®, MOZILLA® THUNDERBIRD®, etc.

In some embodiments, computer system 601 may store user/application data 621, such as the modules, data, variables, records, etc. as described in this disclosure. For example, the modules described in this disclosure may be implemented in software, and processor 602 may be configured to execute the modules stored as part of the user/application data 621. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of any computer or database component may be combined, consolidated, or distributed in any working combination.

The specification has described a system and method facilitating communication in an adaptive virtual environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A system for facilitating communication in an adaptive virtual environment, the system comprising:
    a processor; and
    a memory storing processor-executable instructions comprising instructions for:
        creating a virtual image of a communication device running services rendered by one or more telecom service providers;
        emulating hardware and software configuration of the communication device in the virtual image, wherein the virtual image is stored in a cloud server;
        synchronizing the cloud server post storing the hardware and software configuration in the virtual image, with a device memory of a user device at pre-determined intervals of time;
        remotely installing the hardware and software configuration in the user device upon executing the virtual image thereby creating a virtual environment in the user device;
        generating a unique number for the user corresponding to the virtual image;
        switching between the one or more telecom service providers for communication based upon the unique number;
        enabling call routing feature by using the virtual image; and
        generating a bill for the communication device with respect to a service provided by the one or more telecom service providers.

2. The system of claim 1, wherein the switching between one or more telecom service providers further comprises remotely managing connectivity of the communication device with the one or more telecom service providers using the virtual image within the virtual environment.

3. The system of claim 1, wherein the hardware and software configuration of the communication device relates to at least one of making a call; receiving a call; or browsing an information network.

4. The system of claim 1, wherein the synchronizing step comprises communicating at least one of contact details, an image file, or a text file.

5. The system of claim 1, wherein the cloud server in which the virtual image is stored is one of Amazon Web Services (AWS), or Google App Engine (GAE).

6. A method for facilitating communication in an adaptive virtual environment, the method comprising:
    creating, by a processor, a virtual image of a communication device running services rendered by one or more telecom service providers;
    emulating, by the processor, hardware and software configuration of the communication device in the virtual image, wherein the virtual image is stored in a cloud server;
    synchronizing, by the processor, the cloud server post storing the hardware and software configuration in the virtual image, with a device memory of a user device at pre-determined intervals of time;
    remotely installing, by the processor, the hardware and software configuration in the user device upon executing the virtual image thereby creating a virtual environment in the user device;
    generating, by the processor, a unique number for the user corresponding to the virtual image;
    switching between the one or more telecom service providers for communication based upon the unique number;
    enabling call routing feature by using the virtual image; and
    generating a bill for the communication device with respect to a service provided by the one or more telecom service providers.

7. The method of claim 6, further comprising remotely managing connectivity of the communication device with the one or more telecom service providers using the virtual image.

8. A non-transitory computer-readable medium embodying a program executable in a computing device for facilitating communication in an adaptive virtual environment, the program comprising instructions to:

- create a virtual image of a communication device running services rendered by one or more telecom service providers;
- emulate hardware and software configuration of the communication device in the virtual image, wherein the virtual image is stored in a cloud server;
- synchronize the cloud server post storing the hardware and software configuration in the virtual image, with a device memory of a user device at pre-determined intervals of time;
- remotely install the hardware and software configuration in the user device upon executing the virtual image thereby creating a virtual environment in the user device;
- generate a unique number for the user corresponding to the virtual image;
- switch between the one or more telecom service providers for communication based upon the unique number;
- enable call routing feature by using the virtual image; and
- generate a bill for the communication device with respect to a service provided by the one or more telecom service providers.

9. The non-transitory computer-readable medium of claim 8, the instructions further comprising instructions to remotely manage connectivity of the communication device with the one or more telecom service providers using the virtual image.

* * * * *